Figure 1:
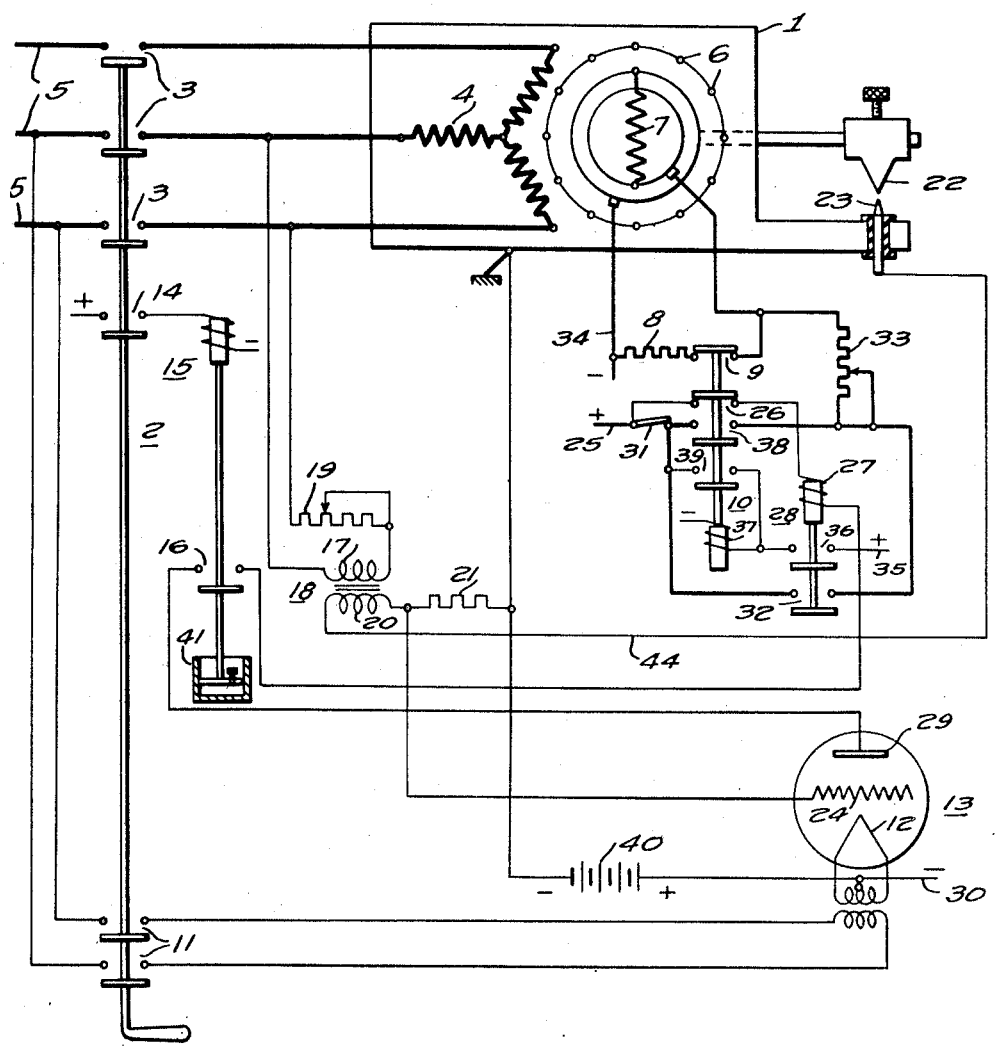

Feb. 11, 1941.    F. H. GULLIKSEN    2,231,714
MOTOR CONTROL SYSTEM
Filed Feb. 23, 1939    2 Sheets-Sheet 1

WITNESSES:
E. A. McCloskey
Thw. C. Groome

INVENTOR
Finn H. Gulliksen.
BY
Paul E. Friedemann
ATTORNEY

Feb. 11, 1941.    F. H. GULLIKSEN    2,231,714
MOTOR CONTROL SYSTEM
Filed Feb. 23, 1939    2 Sheets-Sheet 2
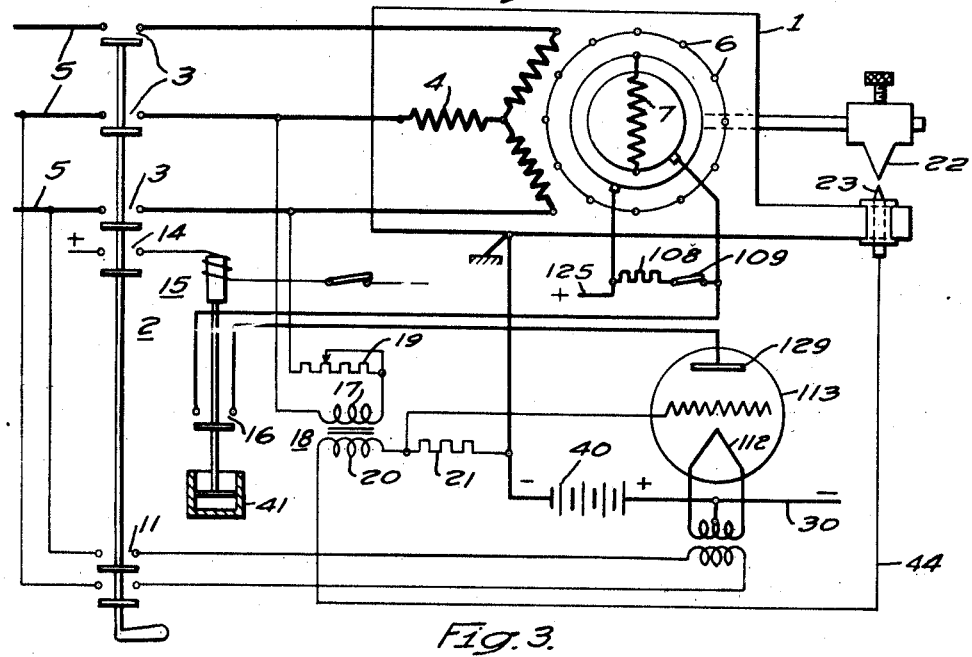
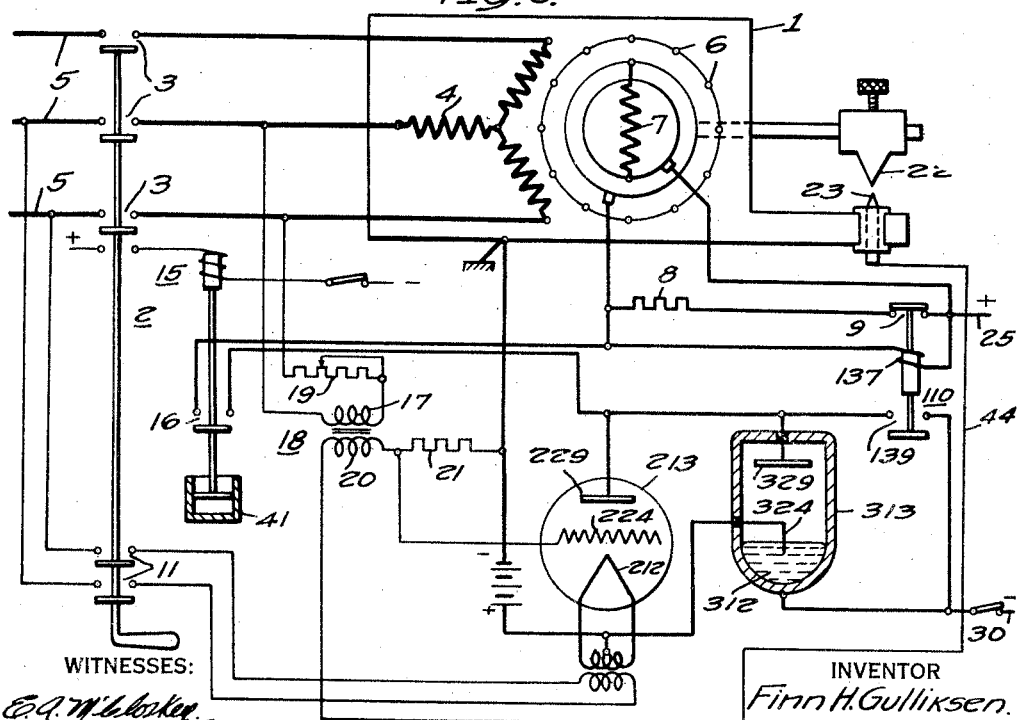
WITNESSES:
INVENTOR
Finn H. Gulliksen.
BY
ATTORNEY Patented Feb. 11, 1941

2,231,714

UNITED STATES PATENT OFFICE 2,231,714

MOTOR CONTROL SYSTEM

Finn H. Gulliksen, Pittsburgh, Pa., assignor to Westinghouse Electric & Manufacturing Company, East Pittsburgh, Pa., a corporation of Pennsylvania Application February 23, 1939, Serial No. 257,854

11 Claims. (Cl. 172—289)

My invention relates to control systems, and more particularly to systems for controlling the application of excitation to the field winding of a synchronous motor or other synchronous dynamo-electric machine.

One object of my invention is to excite the field winding at a selected optimum angular relation between the pole pieces of the machine and the rotating armature flux.

The pull-in torque of a synchronous motor depends on the motor design, on the load on the motor at synchronization, on the angular relation of the pole pieces at the instant the field becomes fully excited with reference to the rotating armature flux, and probably on a few other factors, which other factors are, however, as a rule of such negligible value that they can be disregarded.

For any given machine, the design is fixed and for any given application, the starting torque is fixed or can be selected to be a definite value. If the starting torque is high, it may well be that a synchronous motor will not pull into step—will not synchronize—unless the field becomes fully excited at an instant when the pole pieces are within some desirable range with reference to the rotating armature flux. The heavier the starting torque, the more narrow is this range.

It is an object of my invention to provide for energizing the field winding at such an instant to obtain maximum pull-in torque for the motor.

Another object of my invention is to provide for energization of the field winding at an instant so that a given point on the field poles may have, at the instant the field becomes fully energized, any selected angular relation to a given point on the wave of flux rotating in the armature.

Other objects and advantages of my invention will become more apparent from a study of the following specification when made in conjunction with the accompanying drawings, in which:

Figure 1 represents diagrammatically a starting control embodying my invention to be used with a synchronous motor and Figs. 2 and 3 represent diagrammatically modified starting control systems also embodying my invention to be used with synchronous motors.

Referring to Figure 1, the motor provided with my system of control is generally designated by 1 and has an armature winding 4, that may be connected to the three-phase buses 5 by the switches 3 of the circuit breaker 2.

I do not show any provisions, other than a handle, for operating the circuit breaker. Clearly, this circuit breaker may be operated electromagnetically, which electromagnetic operation may be by remote control, or the circuit breaker may be operated in any other manner.

The motor 1 has a conventional damper winding 6 and a field winding 7. The field winding 7 is provided with a discharge resistor 8, the discharge circuit of which may be interrupted by the back contact members 9 of the main field contactor 10.

The main circuit breaker is provided with contact members 11 for energizing the cathode 12 of the grid controlled electric discharge device 13, and is provided with contact members 14 for energizing the time limit device 15. The time constant of the time limit device 15 is preferably adjusted to be just long enough so that the motor during starting will be up to its balancing speed, operating as an induction motor, for the maximum expected load on the motor, before contact members 16 close.

When contact members 16 close, the anode circuit for the anode 29 of the electronic discharge device 13 is closed. The instant, after contact members 16 close, that discharge device 13 becomes conducting, a conducting circuit is established for high speed field contactor 28 and the field 7 become energized with direct current. The details will be discussed later.

The motor shaft is provided with an angularly adjustable metallic terminal or electrode 22 adapted to cooperate with a terminal, or electrode 23 mounted on the frame, but electrically insulated therefrom. The secondary 20 of the transformer 18 is electrically so connected to the motor structure and the electrode 23 that a high peaked voltage, appears across electrode 23 and the motor shaft. If the terminal 22 is adjacent terminal 23 at the time the high peaked voltage of the secondary is produced, a spark occurs at the electrodes 22 and 23. This spark changes the bias of the grid 24 with the result that the discharge device 13 becomes conducting.

When the discharge device 13 becomes conducting, as has been stated hereinbefore, high speed field contactor 28 is operated. The operation of this contactor causes the energization of the field winding 7 with direct current. By a proper positioning of the electrode 22 with reference to the rotor structure, the motor may be made to pull into step—synchronize—with maximum pull-in torque.

The operation of the high-speed field contactor 28 operates the main field contactor 10, which main field contactor is designed to continuously carry the field current, whereas the high-speed field contactor, being of light weight, is designed to carry the field current for the short interval of time it normally remains closed.

If desired, the field contactor need not be used but the discharge device 113 can be used directly to energize the field winding, as shown in Fig. 2.

The control of the discharge device 113 shown in Fig. 2 is exactly as shown in Fig. 1 except the discharge device is chosen of a capacity to carry the field current of the field 7. The advantage of this scheme is that substantially no time elapses between the correct positioning of the electrodes 22 and 23 and the application of the direct current to the field winding 7. In the modification shown in Fig. 2, it may be desirable to use a high resistance discharge resistor 108 permanently connected across the field, or some automatic or manual means, as switch 109, may be provided for opening the field discharge circuit after synchronization of the motor is completed.

My invention may also take the form indicated in Fig. 3. In this modification, the control of the electric discharge device 213 is exactly as the control for discharge devices 13 and 113. Operation of the discharge device 213 ignites the ignitron discharge device 313. The field is thus fully energized substantially instantaneously after the electrodes 22 and 23 are in the correct position. When the field 7 is energized, relay or main field contactor 110 also becomes energized and the ignitron tube is shunted out and the field is connected directly to the source of direct current.

A still better understanding of my invention may be had from a study of a typical sequence of operation.

To start the motor 1, the attendant causes the operation of the circuit breaker 2 to thus close the switches 3 to thus connect the primary winding or armature 4 of the motor 1 and the primary windings 17 of the transformer 18 to the buses 5. The motor is thus started as an induction motor on the squirrel cage winding 6, and the control circuits, except the anode circuit, are energized.

At the instant of energization of winding 4, an alternating current of line frequency is induced in the field winding 7. The current thus induced in the field winding 7 is discharged through the discharge resistor 8 and back contact members 9 of the main field contactor 10. As the motor speeds up, the frequency in field winding 7 decreases and at the balancing speed of the motor, the frequency will become nearly constant and will be a measure of the slip of the motor. This slip may vary between two or three percent of the synchronous speed of the motor.

At the instant the circuit breaker is operated, contact members 11 are also closed to thus energize the cathode 12 of the electric discharge device 13. The filament or cathode is thus immediately heated for later operation.

Operation of the circuit breaker also closes the contact members 14 to energize the time limit device 15. After a predetermined time interval, this time limit device operates to close its contact members 16. Closure of contact members 16 closes the circuit for anode 29.

Operation of the circuit breaker energizes the primary 17. This primary winding 17 is connected in series with adjustable resistor 19. The secondary winding 20 is connected in series with a resistor 21, the grounded frame of the motor 1, the angularly adjustable electrode 22, the electrode 23, and conductor 44 back to the secondary 20 of the transformer 18.

The transformer 18 is designed to produce a sharp high voltage impulse and, being interconnected with the alternating-current buses, will do so every half-cycle. When the rotor of the synchronous motor, and thus the electrode 22, is in the correct position, the impulse voltage occurs when the spacing between electrodes 22 and 23 is a minimum. This causes the air gap between electrodes 22 and 23 to flash over. A high positive voltage thus briefly appears on grid 24 of the electric discharge device, and the discharge device breaks down. An energizing circuit is thus established from positive conductor 25, through back contact members 26 of the main field contactor 10, the actuating coil 27 of the high speed field contactor 28, contact members 16 of time limit relay 15, the anode 29, the cathode 12, to the negative conductor 30.

Operation of the high speed field contactor establishes a circuit from positive conductor 25, power factor relay switch 31, contact members 32, the rheostat 33, field 7, to the negative bus 34. The field winding 7 is thus energized at an instant when the pole windings have a selected angular relation to the rotating flux in the stator. By a suitable positioning of the electrode 22 on the motor shaft, the time of energization of the field winding 7 may be so selected that the motor 1 pulls into synchronism with a maximum pull-in torque, or any other selected pull-in torque characteristic for the machine being synchronized.

After operation of the high-speed field contactor, a circuit is established from positive conductor 35 through contact members 36 of the high-speed field contactor, actuating coil 37 of the main field contactor 10. The main field contactor thus energizes the field 7 through contact members 38, holds itself energized through contact members 39, opens the discharge circuit for the field at contact members 9, and deenergizes the high-speed field contactor at contact members 26.

The battery 40 provides the requisite bias to the grid 24 of the discharge device 13.

The adjustable resistor 19 is used to adjust the character of the impulse voltage of the impulse transformer, where as the device 41 is utilized to adjust the time of closure of contact members 16 so as to take place at a time when the motor is up to its balancing speed.

In Fig. 2, I have given the elements, which are the same as those in Fig. 1, the same reference characters. The operation of the elements having the same reference characters in Fig. 2, is the same as for the showing in Fig. 1 and, therefore, need not be repeated.

Operation of time limit device 15 closes the contact members 16. The very first time, after closure of contact members 16, the electrodes 22 and 23 are adjacent each other, a spark occurs and this spark initiates the operation of electric discharge device 113. Operation of electric discharge device 113 establishes a circuit from positive conductor 125 through field winding 7, contact members 16, anode 129, cathode 112 to the negative conductor 30. The field winding 7 is thus energized at an instant to provide maximum pull-in torque.

In the showing of Fig. 3, the operation of the elements corresponding to like elements in Fig. 1 is the same. For the larger machines, no discharge devices of the grid-controlled type are yet available to carry the heavy field currents. Discharge device 213 is thus so connected that when a current is initiated by grid 224 to flow between electrodes 229 and 212, the ignitron tube 313 is ignited by means of terminal 324 and as a consequence, ignitron tube 313 becomes conducting. A current thus flows from positive conductor 25 through field winding 7, contact members 16, electrodes 329 and 312 to the negative conductor 30.

A circuit is also established from conductor 25 through the actuating coil 137 of field contactor 110, electrodes 329 and 312 to negative conductor 30. Operation of field contactor 110 causes the closing of contact members 139 to thus shunt both the electronic devices 213 and 313.

From the foregoing specification and the drawings accompanying it, it is apparent that I have provided a simple, cheap, efficient, and reliable angle switching scheme.

I am aware that others, particularly after having had the benefit of my disclosure, may devise other, possibly similar, circuit diagrams for accomplishing the same or similar results. I, therefore, do not wish to be limited to the specific showing made, but wish to be limited only by the claims hereto appended and such prior art as may be pertinent.

I claim as my invention:

1. In a system of control for a synchronous motor, in combination, a synchronous motor having a stator, or armature, winding, a damper winding, and a field winding on the rotor, a source of alternating current, means for connecting the armature winding to the source of alternating current, to produce a rotating flux in the stator and thus, in coaction with the damper winding, cause rotation of the rotor, an electrode mounted on the shaft of the motor, an electrode mounted on the stator of the motor and so disposed that the electrode on the shaft of the motor moves adjacent the electrode on the stator at each complete rotation of the shaft, means for producing a voltage impulse on the electrodes each time the rotating flux in the stator holds a given physical position with reference to the stator whereby a spark is caused to occur between the electrodes each time a given point on the rotor holds a given phase position with reference to the wave of flux rotating in the stator, and means responsive to the spark adapted to energize the field winding of the motor.

2. In a system of control for a synchronous motor, in combination, a synchronous motor having an armature winding on the stator and a field winding on the rotor, a source of alternating-current, means for connecting the armature winding to the source of alternating current, a source of direct current, field energizing means for connecting the field winding to said source of direct current, said field energizing means comprising means for producing a spark discharge each time a certain voltage peak is applied to the armature winding and the pole pieces carrying the field winding hold a given position to a given point on the stator, and means responsive to such spark discharge adapted to substantially instantaneously apply direct current to the field winding to thus provide a maximum pull-in torque for the motor.

3. In a system of control for a synchronous motor, in combination, a synchronous motor having an armature winding and a field winding, a source of alternating-current, means for connecting the armature winding to the source of alternating current, a source of direct current, field energizing means for connecting the field winding to said source of direct current, said field energizing means comprising an electronic discharge device having its principal electrodes connected in series with the field winding and the source of direct current, and means for igniting the electronic discharge device at an instant when the armature flux and field winding hold such a position that maximum pull-in torque for the motor is obtained.

4. In a system of control for a synchronous motor, in combination, a synchronous motor having an armature winding and a field winding, a source of alternating-current, means for connecting the armature winding to the source of alternating current, a source of direct current, field energizing means for connecting the field winding to said source of direct current, said field energizing means comprising an ignitron type electronic discharge device having a pair of principal electrodes and an igniting electrode, and having its principal electrodes connected in series with the field winding and the source of direct current, a grid-controlled electronic discharge device having its principal electrodes connected in series with the igniting electrode, and means for causing the grid-controlled discharge device to become conducting and thus ignite the ignitron tube at an instant to provide field excitation at a selected optimum angular relation between the rotating armature flux and the field structure.

5. In a starting control system for a synchronous motor, in combination, a synchronous motor having an armature winding and a field winding, a source of alternating current, means for connecting the armature winding to the source of alternating current, a source of direct current, means for connecting the field winding to the source of direct current, a spark electrode mounted on the stator of the motor, a spark electrode mounted on the shaft of the rotor of the motor adapted to move adjacent the electrode on the stator, means for producing a voltage impulse on the electrodes each time the rotating flux has a definite relation to the electrode on the stator whereby a spark will occur when the electrode on the rotor is adjacent the electrode on the stator, and the voltage impulse also occurs at such time, and means responsive to the spark adapted to energize the field winding with direct current.

6. In a starting control system for a synchronous motor, in combination, a synchronous motor having an armature winding and a field winding, a source of alternating current, means for connecting the armature winding to the source of alternating current, a source of direct current, means for connecting the field winding to the source of direct current, a spark electrode mounted on the stator of the motor, a spark electrode mounted on the shaft of the rotor of the motor adapted to move adjacent the electrode on the stator, means for producing a voltage impulse on the electrodes each time the rotating flux has a definite relation to the electrode on the stator whereby a spark will occur when the electrode on the rotor is adjacent the electrode on the stator, and the voltage impulse also occurs at such time, electronic means having a pair of principal electrodes and a control electrode for causing the electronic means to become conducting, the principal electrodes being connected in series with the field winding and the source of direct current to thus effect the energization of the field when the electronic means become conducting, and means for controlling the control electrode by the spark.

7. In a starting control system for a synchronous motor, in combination, a synchronous motor having an armature winding and a field winding, a source of alternating current, means for connecting the armature winding to the source of alternating current, a source of direct current, means for connecting the field winding to the source of direct current, a spark electrode mounted on the stator of the motor, a spark electrode mounted on the shaft of the rotor of the motor adapted to move adjacent the electrode on the stator, means for producing a voltage impulse on the electrodes each time the rotating flux has a definite relation to the electrode on the stator whereby a spark will occur when the electrode on the rotor is adjacent the electrode on the stator, and the voltage impulse also occurs at such time, electronic means having a pair of principal electrodes and a control electrode for causing the electronic means to become conducting, the principal electrodes being connected in series with the field winding and the source of direct current to thus effect the energization of the field when the electronic means become conducting, means for controlling the control electrode by the spark, and means for delaying the energization of the control electrode for a definite time after the armature winding is energized with alternating current.

8. In a starting control system for a synchronous motor, in combination, a synchronous motor having an armature winding and a field winding, a source of alternating current, means for connecting the armature winding to the source of alternating current, a source of direct current, means for connecting the field winding to the source of direct current, a spark electrode mounted on the stator of the motor, a spark electrode mounted on the shaft of the rotor of the motor adapted to move adjacent the electrode on the stator, means for producing a voltage impulse on the electrodes each time the rotating flux has a definite relation to the electrode on the stator whereby a spark will occur when the electrode on the rotor is adjacent the electrode on the stator, and the voltage impulse also occurs at such time, an ignitron tube having an anode and cathode and an ignition electrode having its anode and cathode connected in series with the field winding and the source of direct current, a grid-controlled discharge device adapted to ignite the ignitron tube, and means adapted to ignite the grid-controlled discharge device by said spark.

9. In a starting control system for a synchronous motor, in combination, a synchronous motor having an armature winding and a field winding, a source of alternating current, means for connecting the armature winding to the source of alternating current, a source of direct current, means for connecting the field winding to the source of direct current, a spark electrode mounted on the stator of the motor, a spark electrode mounted on the shaft of the rotor of the motor adapted to move adjacent the electrode on the stator, means for producing a voltage impulse on the electrodes each time the rotating flux has a definite relation to the electrode on the stator whereby a spark will occur when the electrode on the rotor is adjacent the electrode on the stator, and the voltage impulse also occurs at such time, an ignitron tube having an anode and cathode and an ignition electrode having its anode and cathode connected in series with the field winding and the source of direct current, a grid-controlled discharge device adapted to ignite the ignitron tube, means adapted to ignite the grid-controlled discharge device by said spark, and means for delaying the ignition of the grid-controlled discharge device for a definite time after the stator is energized with alternating current.

10. In a system of control, in combination, an electric circuit, a source of electric energy, means for connecting the said electric circuit to the source of electric energy, a second electric circuit, a second source of electric energy, a pair of electrodes, means for periodically producing a sharp voltage impulse on the electrodes a definite time interval after the first named electric circuit is connected to the first named source of electric energy, means for non-periodically moving the electrodes adjacent each other, and means responsive to the voltage impulse occurring at a time when the electrodes are adjacent to each other, adapted to connect said second named circuit to the second named source of electric energy.

11. In a system of control, in combination, an electric circuit, a source of energy, means for connecting the said circuit to the said source of energy, a second electric circuit, a second source of energy, a pair of electrodes adapted to move adjacent each other with a rising frequency, means for producing an electrical effect on said electrodes at a given frequency a definite time interval after the first named circuit is connected to the first named source of energy, and means responsive to the instantaneous simultaneous occurrence of the electrical effect on the electrodes and their movement adjacent to each other, adapted to connect the second named circuit to the second named source of energy.

FINN H. GULLIKSEN.